GEORGE P. CLEMENT
INVENTOR.

Oct. 16, 1951     G. P. CLEMENT     2,571,421
COLD PROCESS WATER SOFTENER

Filed Jan. 21, 1948     5 Sheets-Sheet 2

GEORGE P. CLEMENT
*INVENTOR.*

BY

Oct. 16, 1951  G. P. CLEMENT  2,571,421
COLD PROCESS WATER SOFTENER
Filed Jan. 21, 1948  5 Sheets-Sheet 3

GEORGE P. CLEMENT
*INVENTOR.*

BY

GEORGE P. CLEMENT
*INVENTOR.*

Oct. 16, 1951 G. P. CLEMENT 2,571,421
COLD PROCESS WATER SOFTENER
Filed Jan. 21, 1948 5 Sheets-Sheet 5

GEORGE P. CLEMENT
*INVENTOR.*

Patented Oct. 16, 1951

2,571,421

UNITED STATES PATENT OFFICE 2,571,421

COLD PROCESS WATER SOFTENER

George P. Clement, New York, N. Y., assignor to Worthington Pump and Machinery Corporation, Harrison, N. J., a corporation of Delaware Application January 21, 1948, Serial No. 3,511

14 Claims. (Cl. 210—16)

1

This invention relates to the art of water purification and is particularly concerned with an improved apparatus for mixing raw water, chemicals, and slurry.

As is well known, the two basic steps in the softening of water by the cold process are, first, mixing the raw water with chemicals, such as lime or soda ash, to form insoluble compounds with the undesirable constituents and, second, separating the precipitates thus formed from the water. Purification by this simple chemical reaction is, however, a lengthy process since the insoluble compounds are so small in size that they do not readily precipitate until they have had an opportunity to agglomerate and grow heavy enough to settle out of the water. It has been found that by causing a relatively large amount of precipitated solids to remain in circulation in the water the rate of softening is greatly increased. This beneficial discovery has been explained by observations which indicate that the circulating solids act as carriers of the chemicals and as nuclei to hasten formation, agglomeration, and separation of the reaction products from the water. In view of this discovery the preferred water softening process now comprises the steps of mixing the raw water with chemicals to form insoluble compounds, recirculating the insoluble compounds through that zone wherein the chemicals and water are mixed, and separating the insoluble compounds from the water.

The various apparatus for carrying out this process, of course, all include tanks which, in general, have separation zones and mixing zones with suitable partitions in the mixing zone to direct recirculation of the solids. These apparatus have employed one of two means for actuating recirculatory flow, viz., first, moving stream projecting surfaces (impellers) and, second, eductor tubes utilizing the incoming water as an eductor medium.

The present invention provides a novel means for actuating recirculatory flow. This is the pressure difference along the diameter of a vortex which is created in the mixing zone. The vortex results from appreciable rotation of fluid in the mixing zone and is preferably actuated by the energy of incoming raw water entering in suitably directed jets.

It will be seen, therefore, particularly with respect to equipment now known to the art, that the present invention has a number of objects, one of which is to substantially eliminate moving parts from water treating apparatus. A second object is to increase the efficiency of that type of apparatus which embodies recirculatory flow.

A third object is to provide an apparatus which is basically simple and economical to construct and operate.

Another object is to provide an apparatus embodying a basic recirculatory mechanism which is capable of a wide variety of structural modifications in order to meet specific operating conditions.

Other features and objects of the invention will become apparent from the description of the following drawings in which Figure 1 is a longitudinal section through a water treating apparatus of a preferred form embodying the invention.

Figure 1:
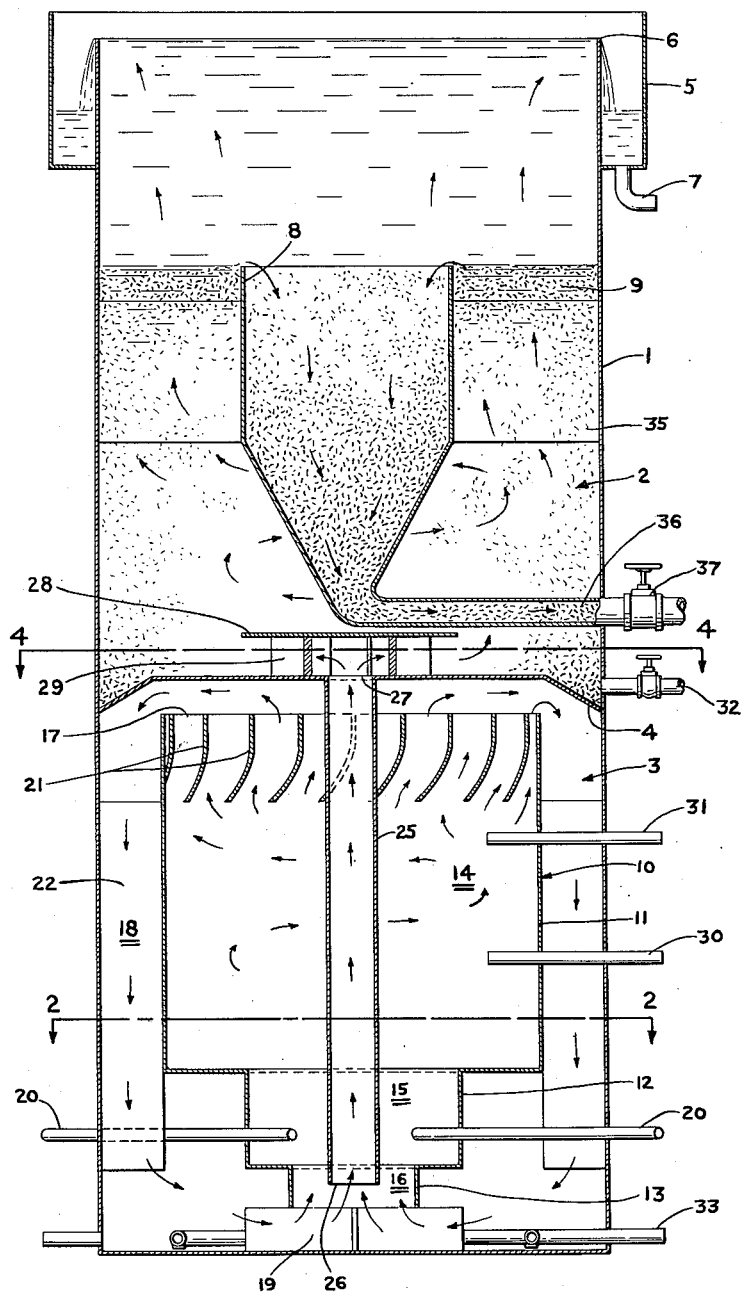
Figure 3:
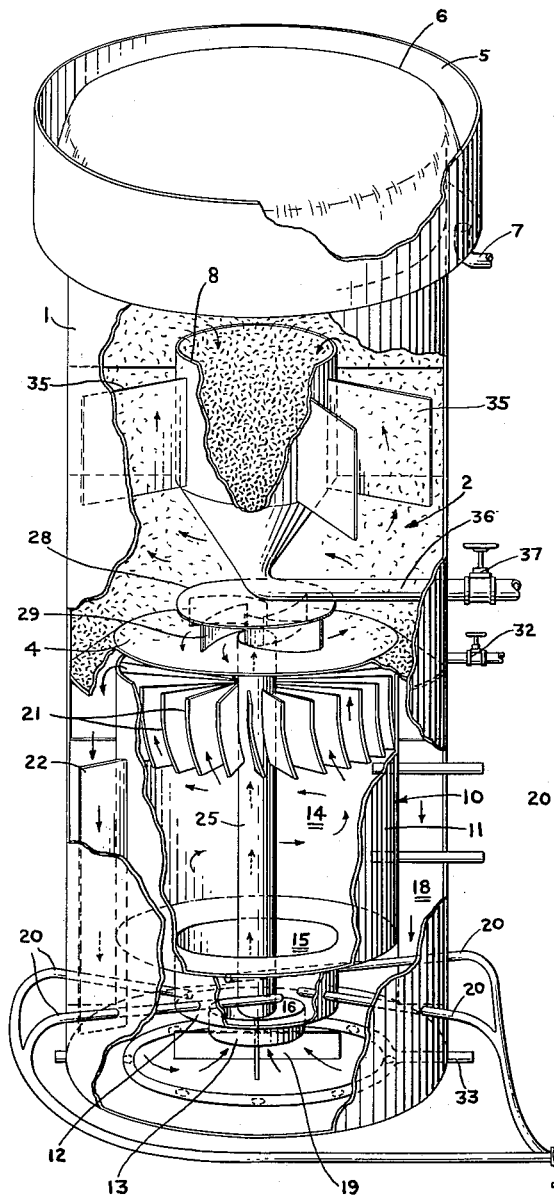
Figure 3 is a view in perspective with parts broken away of the device of Figures 1 and 2.
Figure 4:
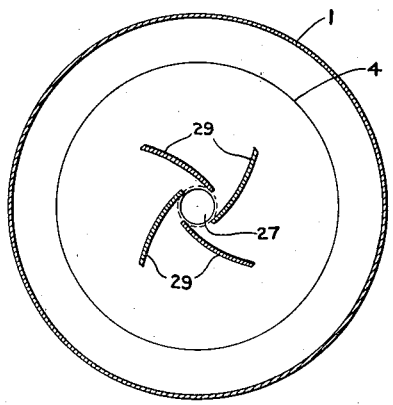
Figure 4 is a section along the line 4—4 of Figure 1.
Figure 2:
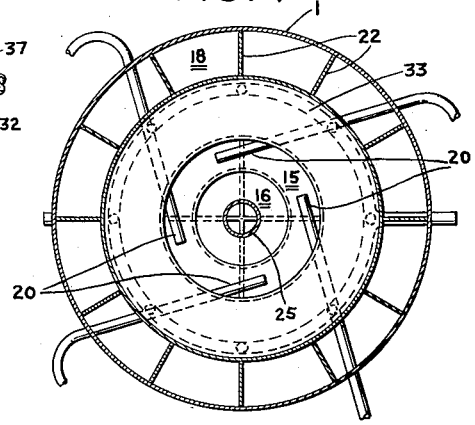
Figure 2 is a cross section of the apparatus shown in Figure 1 taken along the line 2—2 thereof.

The water treating apparatus of Figure 1 has a vertical housing or receptacle 1 which is preferably cylindrical and is divided into the upper separation chamber 2 and the lower reaction chamber 3 by a horizontal partition 4. The structure above and not connected to the partition 4 forms no part of the present invention and may be of any desired construction. In the present case the preferred structure comprises an annular treated water storage tank 5 located about the top 6 of the tank 1 to receive water spilling over the upper edge thereof. The tank 5 has an outlet 7 through which treated water is withdrawn. A concentrator 8 is mounted within the chamber 2 adjacent the floc bed 9 so that excess precipitated solids may be drawn off in the usual manner.

A hollow casing 10 is mounted in the reaction chamber 3. It is preferably cylindrical, though it may be conical or of other shapes, and may be made up of an upper portion 11 of large diameter, an intermediate portion 12 of intermediate diameter, and a lower portion 13 of small diameter. The interior of portion 11 comprises the primary mixing chamber 14, the interior of portion 12 comprises the water inlet chamber 15, and the lower portion 13 comprises the slurry inlet 16. The top of the casing 10 comprises an outlet 17 for mixing chamber 14. The annular space between the outer surface of the casing 10 and the walls of the tank 1 is the recirculation chamber 18. The casing 10 is mounted on a supporting and flow guiding member 19 so that the inlet 16 is spaced above the bottom of the tank. It will thus be seen that there is nothing to prevent free and continuous circulation of fluid through chambers 14, 15, and 18.

The energy for such circulation, or recirculation as it is usually referred to, is preferably provided by the incoming raw water. This is fed into the inlet chamber 15 by means of tangentially arranged nozzles 20. Water issuing in jets from the inlet members 20 strikes the cylindrical walls of the chamber 15 whereupon it is deflected into rotary motion. As a result of this action, the entire body of fluid within the casing 10 is caused to rotate about the axis of the casing 10 and the tank 1. Such rotation creates a vortex and causes an appreciable variation in velocity head of the fluid along any radial section of the casing 10. Theoretically, at least, this head increases parabolically with the distance from the center of rotation. As a consequence, fluid in a cylindrical extension of the inlet 16 is at a lower pressure than other fluid in the reaction chamber 3. Fluid is, therefore, forced by the pressure difference to flow from the recirculation chamber 18 through the inlet 16 into the casing 10. This fluid is then caught up by the mass of rotating fluid in the casing and is thrown outwardly by centrifugal force. It rises and passes out of the casing 10 through the outlet 17 from whence it flows downwardly through the recirculation chamber 18 to repeat the cycle of recirculation.

The upper portion 11 of the casing 10 has adjacent the outlet 17, a plurality of flow directing vanes 21 which are designed to arrest rotary movement of the fluid passing out of the casing 10 and to convert some of this velocity energy into pressure head thus increasing the pressure difference between the fluid in the recirculation chamber 18 and that at the inlet 16. Stationary vanes 22 may also be provided in the annular recirculation chamber 18 to further induce linear flow of the fluid prior to its passage through the inlet 16. The flow guiding member 19 is also constructed to reduce rotation of the fluid entering the casing 10.

The pipe or conduit 25 provides for the passage of fluid from the reaction chamber 3 to the separation chamber 2. This conduit is coaxial with the casing 10 and has its inlet 26 located in the low pressure area below the inlet jets 20. Thus, some of the fluid which is forced from the recirculation chamber into the casing 10, as described above, flows upwardly through the pipe 25. The outlet 27 of the conduit 25 is in partition 4 so that fluid flows up into the bottom of the separation chamber 2. Since fluid passing through the pipe 25 has an appreciable velocity a deflector plate 28 is spaced above the outlet 27 to change the axial flow into radial flow. The vanes 29 are spaced around the outlet 27 and impart a gentle rotation to the fluid deflected therethrough by the plate 28.

Chemicals and coagulant are introduced into the reaction chamber 3 by means of the pipes 30 and 31 which are preferably arranged so that their outlets are in the mixing chamber 14.

Sludge blow-off connections of the usual type 32 and 33 may be provided for the bottoms of chambers 2 and 3, respectively, as shown in Figure 1.

In operation, chemicals and coagulant are fed into the mixing chamber 14 through the pipes 30 and 31. Raw water to be treated is fed into the inlet chamber 15 and thus to the mixing chamber 14 through the tangential nozzles 20. The incoming raw water causes a certain amount of turbulent mixing action as well as rotation of the fluid mass within the casing 10 to create the required vortex. This fluid rises through the vanes 21 which at least partly arrest its rotary motion. It is then deflected outwardly by the bottom of the partition 4 and enters the recirculation chamber 18. As previously mentioned, rotation of the fluid creates a pressure difference between the central portion of the casing 10 and other points in the reaction chamber 3. Hence, fluid reaching the recirculation chamber 18 is drawn or forced downwardly around the outer periphery of the casing 10 and through vanes 22 and thence upwardly through the inlet 16 into the casing 10. A part of this fluid flows to the chamber 2 through pipe 25 while the remainder, preferably at least four times the volume of the outgoing fluid, is recirculated around the wall of the casing 10 through the mixing chamber and recirculation chamber.

It is to be noted that in this invention the previously precipitated solids or slurry as well as the raw water and chemicals are kept in constant circulation in the reaction chamber 3. As a consequence, the precipitates resulting from the reaction between the chemicals and the undesirable constituents in the raw water do not form fine individual particles but, instead, are deposited by an accretive process upon the relatively large particles of slurry conveniently present in the chamber. It is thus a mixture of water and slurry particles which is forced up through the pipe 25 into the separation chamber 2.

Upon reaching chamber 2, the fluid is given a gentle rotary motion by the vanes 29 to prevent channeling. As the fluid rises toward the top of the floc bed 9 this rotary motion is arrested by another set of vanes 35 in the annular space between the concentrator 8 and the walls of the tank 1. The fluid thus rises linearly through the top of the floc bed and the slurry particles are filtered out. Due to the reduction in upward velocity caused by the increase in area at the top of the concentrator 8, clarified water issues slowly from the top of the floc bed and rises until it overflows into the storage tank 5 from which it may be drawn for use through the outlet 7. Inasmuch as there is a thorough mixing in the reaction chamber 3 and the particles which enter the floc bed 9 are relatively large, the effluent is very clear and stable and not subject to after-precipitation.

The rate of recirculation of slurry and water in the reaction chamber 3 is regulated so that there is no settling of the floc particles. This rate can be varied by changing the kinetic energy of the incoming raw water such as by varying the radial position of the ends of the tangential inlet nozzles 20 or by changing the areas of these nozzles. It can also be varied by changing the size of the inlet 16 since the rate of recirculation is also a function of the ratio of the distance between opposite nozzle inlets and the diameter of inlet 16. The effect of these physical changes is to vary the speed of rotation of the vortex in the mixing chamber 14. Variations in the speed of rotation cause changes in the pressure difference between the axis and periphery of the casing 10. Since the rate of recirculation is determined by this pressure difference, variations therein result in changes in the rate of recirculation.

Slurry may be removed from the system by means of the concentrator 8. This is simply a hollow receptacle having an outlet pipe 36 to waste through which the passage of material is controlled by means such as the valve 37. Particles in the floc bed 9 slide over the edge of the concentrator and are drawn off in concentrations greater than that existing in the fluid as a whole. Thus, excess solids may be continuously or intermittently removed from the tank at whatever rate is required to maintain the proper density of the fluid mixture. It is obvious that heavy floc particles may also be removed through the drain lines 32 and 33.

Figure 5:
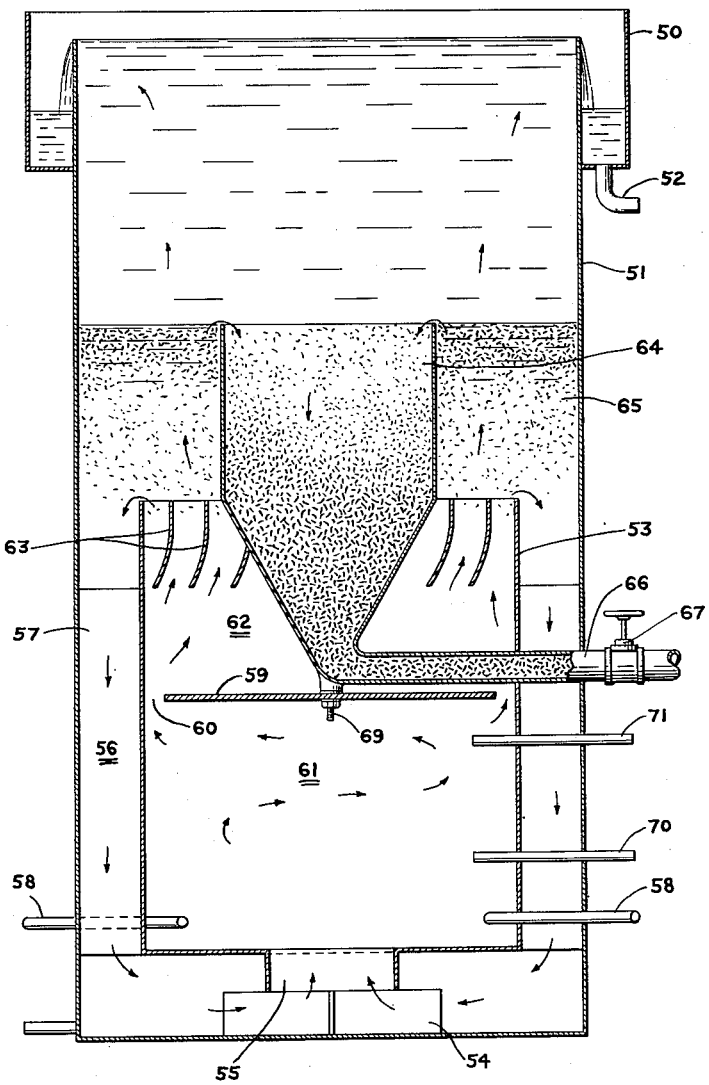
Figure 5 is a longitudinal section of a modified embodiment of the invention.

In the embodiment of Figure 5 there is the usual tank or shell 51 with an annular storage tank 50 around its upper periphery from which treated water is drawn through the outlet 52. The casing 53 in this embodiment is shown as cylindrical though it may, of course, be another surface of revolution. It is mounted on the flow guiding support 54 so that the slurry inlet 55, which is of reduced diameter, is spaced above the bottom of the tank 51. The annular space between the casing and the tank is the recirculation chamber 56 which may have vanes 57 therein for inducing linear flow of the fluid passing therethrough. The inlet nozzles 58 for raw water are tangentially arranged around the lower end of the casing 53 so as to cause rotary action of fluid within the casing and thus create a vortex. Flow out of the casing 53 is obstructed by means of a horizontal circular fluid deflecting plate 59 which is placed in the upper half of the tank. This plate forms with the wall of the casing 53 an annular discharge passage 60. The interior of the casing 53 beneath the plate 59 comprises the primary mixing chamber 61 and that above the plate, the secondary mixing chamber 62. At the top of the secondary chamber 62, the casing 53 carries a number of flow guiding vanes 63 for arresting the rotary motion of the fluid and changing at least part of the velocity energy into potential energy. A sludge concentrator 64 is mounted on the casing 53 by means of the vanes 63 which act as supports therefor. The upper end of the concentrator 64 is located in the floc bed 65 while its lower end extends down into the secondary chamber 62. The pipe 66 connects the lower end of the concentrator to waste and flow therethrough may be controlled by a valve 67. A threaded bore in the plate 59 engages the axial threaded stud 69 which extends downwardly from the bottom of the concentrator 64. This arrangement provides a convenient means for adjusting the axial or longitudinal position of the plate 59.

In operation, fluid within the primary mixing chamber 61 is rotated by the raw water coming in through the nozzles 58 and vortex is created. Chemicals and coagulant are fed to this rotating mass through the inlet pipes 70 and 71. The spinning fluid passes around the plate 59 through the passage 60 into the secondary mixing chamber 62. As it rises therein, it passes through the vanes 63 which at least partially arrest its rotation so that it has substantially linear flow.

In general the mode of operation described in connection with Figure 1 applies to Figure 5 so that there is a pressure difference between the inlet 55 and the upper end of the casing 53 which causes a recirculation of a large amount of the fluid leaving the secondary chamber 62. This fluid, of course, flows downwardly through the vanes 57 in the recirculation chamber 56 and back into the casing 53 through the inlet 55. The remainder of the fluid leaving the secondary chamber 62, equal in quantity to the raw water input, rises vertically to the floc bed 65 which filters out the slurry particles so that only clear treated water issues from the floc bed to pass into the storage tank 50 and outlet 52. The amount of slurry in the system is controlled by withdrawing it through the concentrator 64.

In the device of Figure 5 the rate of recirculation can be controlled, just as in the device of Figure 1, by varying the energy of the incoming water or by varying the size of inlet 55. For predetermined diameters of the nozzles 58 and inlet 55 and predetermined nozzle positions, variations in the diameter of plate 59 also affect the rate of recirculation. There is an optimum diameter, which must be experimentally ascertained, at which maximum recirculation can occur.

The plate 59 functions in much the same manner as the partition 4 of the device of Figure 1. It serves to prevent downflow into the vortex in chamber 61 and also, to some extent, to decrease rotation of the upper body of fluid and thus to conserve energy for the recirculation system.

Figures 6, 7, 8:
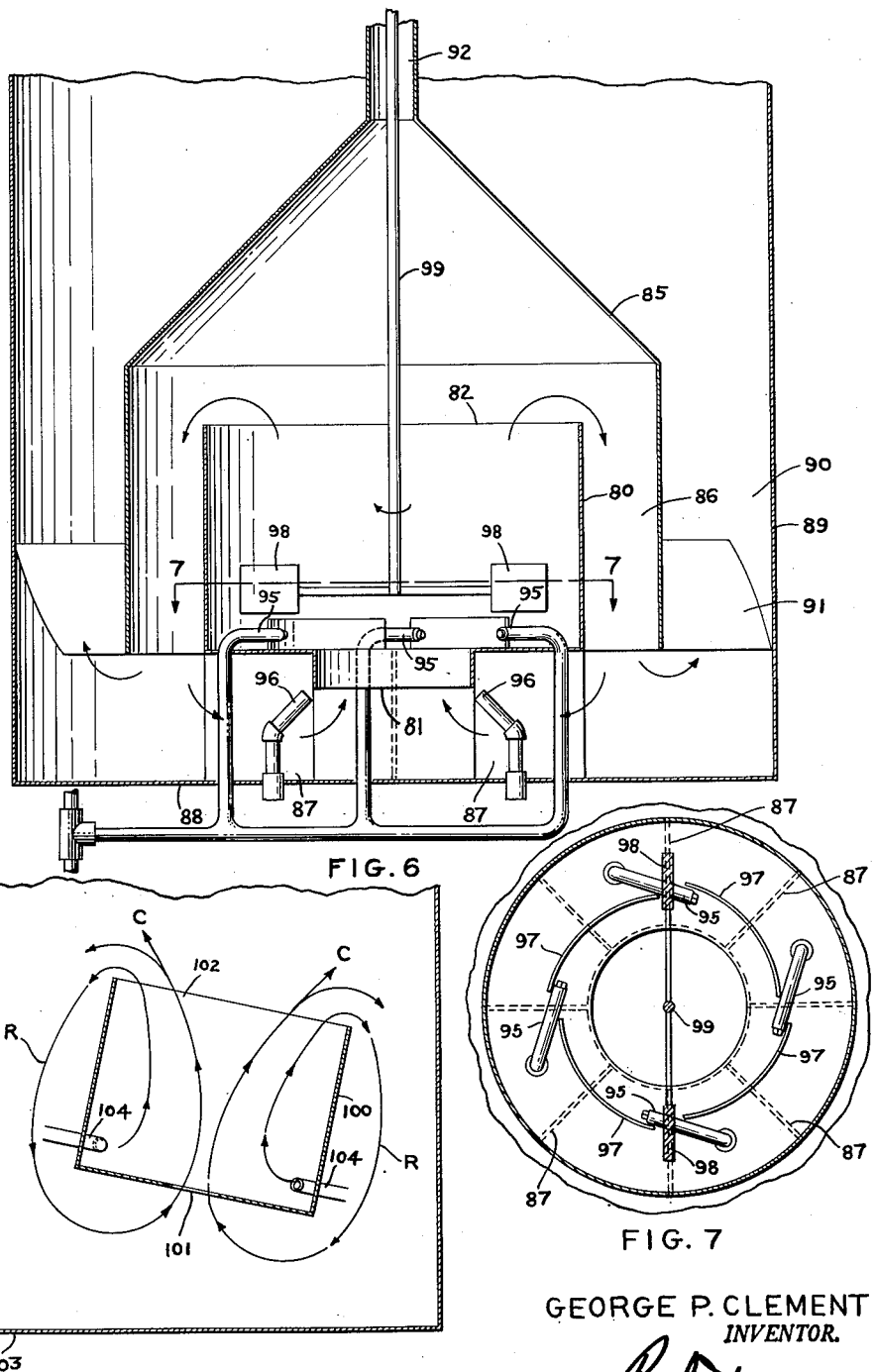
Figure 6 is a longitudinal section through a portion of a water treating apparatus embodying a modified form of the invention.
Figure 7 is a view along line 7—7 of Figure 6.
Figure 8 is a diagrammatic sectional view of the basic form of the invention.

The device of Figure 6 is still another embodiment of the basic principle of using a forced vortex to cause recirculation. In this arrangement, the central casing 80 has a lower inlet 81 of reduced diameter and an upper outlet 82. The casing 80 is substantially enclosed by a larger hood 85 and forms therewith the annular recirculation chamber 86. While not illustrated, this chamber may have flow straightening vanes as in the previous modifications. Both the hood 85 and casing 80 are supported by suitable means 87, which also acts to guide fluid flow, above the bottom 88 of the shell 89 in which they are mounted. The hood 85 and the shell 89 form an annular discharge passage 90 which is in communication with the recirculation chamber 86. This passage may have vanes 91 to guide flow in any desired manner.

The hood 85 has a vent pipe 92 which has an outlet outside of the water treating apparatus. It therefore provides means for escape of trapped gases. It will also be realized that the hood functions as the plate 59 of Figure 5 and the partition 4 of Figure 1 to prevent downflow of fluid and rotation of the fluid in the upper part of the shell 89.

Raw water is pumped into the casing 80 through the tangentially arranged nozzles 95 and chemicals through the nozzles 96 which are located just below the casing, though it will be realized that the chemical inlets could be situated in any other desired position in the path of flow. Fluid ejected from the nozzles 95 strikes the arcuate baffle plates 97 which are mounted on the bottom of the casing 80. Rotary motion of the body of fluid in casing 80 is thus created and maintained so that a vortex is formed as in the previous embodiments. If desired, a paddle wheel 98 may also be used to rotate the fluid within the casing 80. It is rotated by suitable means (not shown) applied to the shaft 90 which rises out of the tank through the pipe 92. Axial elements of the paddles 98 preferably should lie in planes through the axis of the shaft 90 so that they impart no axial components of velocity to the fluid which would tend to destroy the aforementioned pressure distribution desired within the casing 80. Obviously, the paddles 98 can be used as the sole source of energy for rotation, though, in general, there would be no reason for not using the available hydraulic energy. They can also be employed in the embodiments of the invention heretofore described.

The pressure difference in the vortex causes flow out of the casing 80 through at least the peripheral portions of its outlet 82. This fluid is deflected downwardly by the hood 85 and pulled downwardly by suction from inlet 81 which causes it to flow through recirculation chamber 86. Part of the fluid flowing from chamber 86, equal in amount to the throughput of the apparatus, flows up through discharge passage 90 to the upper portions of the shell 89 where the precipitated particles are separated out by the usual means such as those illustrated in the previous embodiments. The remainder of the fluid is forced through inlet 81 where it again becomes part of the vortex within the casing 85.

It will now be easily realized that each embodiment of my apparatus is based upon the principle of actuating recirculation by a forced vortex which is preferably created by hydraulic energy. The most elementary form of device embodying this principle is diagrammatically illustrated in Figure 8 wherein the casing 100 having a reduced inlet 101 and an outlet 102 is disposed within the shell 103. The raw water inlet nozzles 104 project non-radially into the casing and create a vortex with streamlines, in elevation, somewhat as indicated, the symbol C indicating the capacity flow or flow to outlet, and the symbol R indicating recirculatory flow. It is clear from Figure 8 that the present invention is not limited to any particular orientation of the casing 100 with respect to the shell 103 since the vortex created is independent of the shell.

In the device of Figure 8, as well as in the other embodiments, the reaction of chemicals and water occurs primarily in the zone within and around the casing 100 and separation of the precipitated constituents occurs in the upper part of the shell 103 as the mixture of water and solids passes through the floc bed (not shown).

Figure 9:
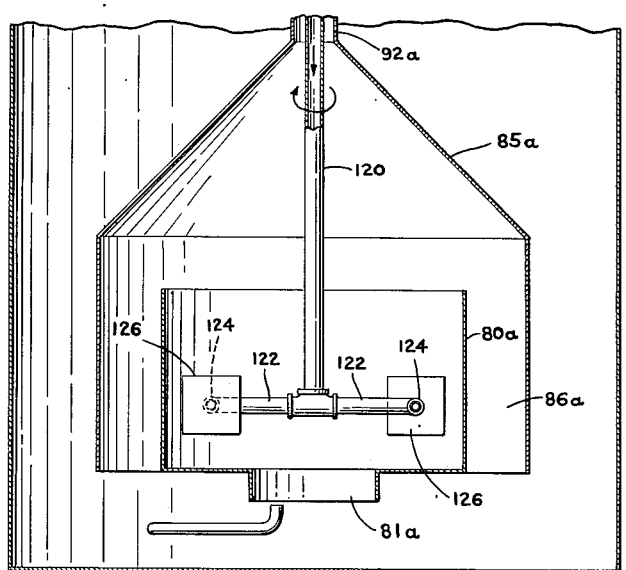
Figure 9 is a longitudinal section through a portion of a modified form of the invention.
Figure 10:
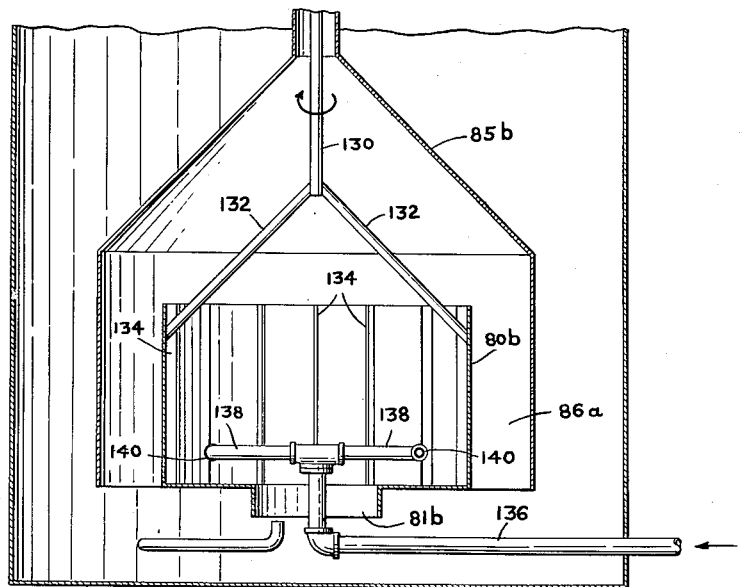
Figure 10 is a longitudinal section through a portion of a modified form of the invention.

As already indicated, it is possible to create a vortex in many different ways. Figures 9 and 10 show two additional means incorporated into the structure of Figure 6 for creating vortices.

In Figure 9 rotative paddles and jets are used. This is most easily accomplished by providing a hollow stem 120 which extends down the tube into the casing 80a. The stem 120 is rotated by suitable means (not shown) and carries inlet raw water by means of a suitable coupling (not shown) with the raw water inlet line (not shown). In the casing a plurality of transverse branch arms 122 extend radially outward from the stem 120. These arms are hollow and water from the stem flows through them and out the nozzles 124 at the ends of the pipes 122. The nozzles are arranged so that water issues in the direction of rotation.

The paddles 128 may be attached by any suitable means to the branch arms 122 and are preferably placed in back of the nozzles 124.

In Figure 10 a vortex is created by rotating the casing 80b. This may be accomplished by fixedly connecting the rotating shaft 130 to the casing by means of suitable arms 132. The shaft 130 is mounted on suitable thrust bearings (not shown) so as to carry the weight of the casing 80b. The friction between the casing 80b and water therein is sufficient to rotate the fluid and create a vortex. However, if desired, longitudinal vanes 134 may be spaced around the inner periphery of the casing 80b to apply normal forces to the fluid.

If desired, the raw water may be tangentially directed into the casing 80b so as to also apply rotative forces to the fluid. Since the casing is rotating this is most easily accomplished by bringing the raw water into the casing through the bottom inlet 81b by means of a pipe 136. This pipe has radial branches 138 in the casing terminating in nozzles 140 which are arranged to direct water in the direction of rotation of the casing. Thus, both hydraulic forces and frictional forces between the rotating casing 80b and the fluid act to establish a vortex.

Figures 8–10 and the other illustrations clearly show that this invention is extremely versatile and flexible and can therefore be used in widely modified forms to suit many different conditions.

What is claimed is:

1. In a water treating apparatus, a cylindrical receptacle having an outlet for treated water, means dividing said receptacle into an upper separation chamber and a lower reaction chamber, a cylindrical casing mounted in said reaction chamber so that its lower end is spaced above the bottom of the receptacle, said casing having a peripheral opening at its upper end, said casing having a coaxial inlet at its lower end of smaller diameter than the peripheral opening, inlet members for water projecting tangentially into said casing, a conduit having its inlet near said casing inlet and its outlet in the bottom of said separation chamber, a baffle plate spaced from said conduit outlet to deflect fluid flowing therethrough and means for feeding a chemical reagent into said reaction chamber.

2. In a water treating apparatus, an outer shell having an outlet for treated water, a casing within said shell forming a mixing chamber having an outlet at its upper end and an inlet of reduced cross sectional area with respect to its outlet located at its lower end, means for feeding chemicals into said mixing chamber, a plurality of nozzles extending tangentially into said mixing chamber in circumferentially spaced relation a short distance upwardly from the inlet to discharge a plurality of streams of water into the mixing chamber tangentially of the walls thereof to produce an upwardly diverging vortex in the mixing chamber with the apex of the vortex in line with and in proximity to said restricted inlet to draw liquid from within the shell through said inlet into the mixing chamber for passage therethrough, a partition in said shell forming a separation chamber and a reaction chamber, said casing being located in said reaction chamber, and a conduit extending from adjacent said inlet through said partition to permit flow of liquid from said mixing chamber into said separation chamber.

3. In a water treating apparatus, an outer shell having an outlet for treated water, a casing within said shell forming a mixing chamber having an outlet at its upper end and an inlet of reduced cross sectional area with respect to its outlet located at its lower end, means for feeding chemicals into said mixing chamber, a plurality of nozzles extending tangentially into said mixing chamber in circumferentially spaced relation a short distance upwardly from the inlet to discharge a plurality of streams of water into the mixing chamber tangentially of the walls thereof to produce an upwardly diverging vortex in the mixing chamber with the apex of the vortex in line with and in proximity to said restricted inlet to draw liquid from within the shell through said inlet into the mixing chamber for passage therethrough, a partition in said shell forming a separation chamber and a reaction chamber, said casing being located in said reaction chamber, and a conduit extending from adjacent said inlet through said partition to permit flow of liquid from the mixing chamber into said separation chamber, a deflection plate in said separation chamber and spaced a predetermined distance from the outlet of said conduit to deflect liquid flowing from the conduit in paths transversely of the flow paths through the conduit.

4. In a water treating apparatus, an outer shell having an outlet for treated water, a casing within said shell forming a mixing chamber having an outlet at its upper end and an inlet of reduced cross sectional area with respect to its outlet located at its lower end, means for feeding chemicals into said mixing chamber, a plurality of nozzles extending tangentially into said mixing chamber in circumferentially spaced relation a short distance upwardly from the inlet to discharge a plurality of streams of water into the mixing chamber tangentially of the walls thereof to produce an upwardly diverging vortex in the mixing chamber with the apex of the vortex in line with and in proximity to said restricted inlet to draw liquid from within the shell through said inlet into the mixing chamber for passage therethrough, a partition in said shell forming a separation chamber and a reaction chamber, said casing being located in said reaction chamber, and a conduit extending from adjacent said inlet through said partition to permit flow of liquid from the mixing chamber into said separation chamber, a deflection plate in said separation chamber and spaced a predetermined distance from the outlet of said conduit to deflect liquid flowing from the conduit in paths transversely of the flow paths through the conduit, and arcuate vanes between said deflector plate and said partition to impart limited rotary movement to liquid flowing from said conduit into said separation chamber.

5. In a water treating apparatus, an outer shell having an outlet for treated water, a casing within said shell forming a mixing chamber having an outlet at its upper end and an inlet of reduced cross sectional area with respect to its outlet located at its lower end, means for feeding chemicals into said mixing chamber, a plurality of nozzles extending tangentially into said mixing chamber in circumferentially spaced relation a short distance upwardly from the inlet to discharge a plurality of streams of water into the mixing chamber tangentially of the walls thereof to produce an upwardly diverging vortex in the mixing chamber with the apex of the vortex in line with and in proximity to said restricted inlet to draw liquid from within the shell through said inlet into the mixing chamber for passage therethrough, a reduced extension upon said casing forming said inlet, a liquid flow guide within said shell and engaging said casing at said inlet for supporting the casing and directing fluid flow to the inlet, a partition in said shell forming a separation chamber and a reaction chamber, said casing being located in said reaction chamber, and a conduit extending from adjacent said inlet through said partition to permit flow of liquid from said mixing chamber into said separation chamber.

6. In a water treating apparatus, an outer shell having an outlet for treated water, a casing within said shell forming a mixing chamber having an outlet at its upper end and an inlet of reduced cross sectional area with respect to its outlet located at its lower end, means for feeding chemicals into said mixing chamber, a plurality of nozzles extending tangentially into said mixing chamber in circumferentially spaced relation a short distance upwardly from the inlet to discharge a plurality of streams of water into the mixing chamber tangentially of the walls thereof to produce an upwardly diverging vortex in the mixing chamber with the apex of the vortex in line with and in proximity to said restricted inlet to draw liquid from within the shell through said inlet into the mixing chamber for passage therethrough, said casing being located in said shell to provide an annular recirculating chamber within the shell about said casing with which recirculating chamber said outlet communicates, a plurality of flow directing vanes carried by said casing about said outlet for reducing the rotational movement of the water at the upper terminus of the vortex, a partition in said shell forming a separation chamber, and a conduit extending from adjacent said inlet through said partition to permit flow of liquid from said mixing chamber into said separation chamber.

7. In a water treating apparatus, an outer shell having an outlet for treated water, a casing within said shell forming a mixing chamber having an outlet at its upper end and an inlet of reduced cross sectional area with respect to its outlet located at its lower end, means for feeding chemicals into said mixing chamber, a plurality of nozzles extending tangentially into said mixing chamber in circumferentially spaced relation a short distance upwardly from the inlet to discharge a plurality of streams of water into the mixing chamber tangentially of the walls thereof to produce an upwardly diverging vortex in the mixing chamber with the apex of the vortex in line with and in proximity to said restricted inlet to draw liquid from within the shell through said inlet into the mixing chamber for passage therethrough, a reduced extension on said casing forming said inlet, a liquid flow guide in said shell and engaging said casing at said inlet for supporting the casing and directing liquid flow to the inlet, a partition in said shell forming a separation chamber, a conduit extending from adjacent said inlet through said partition to permit flow of liquid from said mixing chamber into said separation chamber, a deflection plate in said separation chamber and spaced from the outlet of said conduit to deflect liquid flowing from the conduit in paths transversely of the flow paths through the conduit.

8. In a water treating apparatus, an outer shell having an outlet for treated water, a casing within said shell forming a mixing chamber having an outlet at its upper end and an inlet of reduced cross sectional area with respect to its outlet located at its lower end, means for feeding chemicals into said mixing chamber, a plurality of nozzles extending tangentially into said mixing chamber in circumferentially spaced relation a short distance upwardly from the inlet to discharge a plurality of streams of water into the mixing chamber tangentially of the walls thereof to produce an upwardly diverging vortex in the mixing chamber with the apex of the vortex in line with and in proximity to said restricted inlet to draw liquid from within the shell through said inlet into the mixing chamber for passage therethrough, a reduced extension on said casing forming said inlet, a liquid flow guide in said shell and engaging said casing at said inlet for supporting the casing and directing liquid flow to the inlet, a partition in said shell forming a separation chamber, a conduit extending from adjacent said inlet through said partition to permit flow of liquid from said mixing chamber into said separation chamber, and arcuate vanes between said deflector plate and said partition to impart limited rotary movement to liquid flowing from said conduit into said separation chamber.

9. In a water treating apparatus, an outer shell having an outlet for treated water, a casing within said shell forming a mixing chamber having an outlet at its upper end and an inlet of reduced cross sectional area with respect to its outlet located at its lower end, means for feeding chemicals into said mixing chamber, a plurality of nozzles extending tangentially into said mixing chamber in circumferentially spaced relation a short distance upwardly from the inlet to discharge a plurality of streams of water into the mixing chamber tangentially of the walls thereof to produce an upwardly diverging vortex in the mixing chamber with the apex of the vortex in line with and in proximity to said restricted inlet to draw liquid from within the shell through said inlet into the mixing chamber for passage therethrough, said casing being located in said shell to provide an annular recirculating chamber within the shell about the casing with which recirculating chamber said outlet communicates, a plurality of flow directing vanes carried by said casing about said outlet for reducing rotational movement of liquid at the upper terminus of the vortex, said shell having a separation chamber therein, a floc concentrator within said shell and having an open inlet upper end located at a predetermined location in the shell to allow precipitated floc to flow from the separation chamber, and a liquid deflecting plate in said shell below the bottom of said floc concentrator to deflect liquid laterally towards the side of the shell.

10. In a water treating apparatus, an outer shell having an outlet for treated water, a casing within said shell forming a mixing chamber having an outlet at its upper end and an inlet of reduced cross sectional area with respect to its outlet located at its lower end, means for feeding chemicals into said mixing chamber, a plurality of nozzles extending tangentially into said mixing chamber in circumferentially spaced relation a short distance upwardly from the inlet to discharge a plurality of streams of water into the mixing chamber tangentially of the walls thereof to produce an upwardly diverging vortex in the mixing chamber with the apex of the vortex in line with and in proximity to said restricted inlet to draw liquid from within the shell through said inlet into the mixing chamber for passage therethrough, said casing being located in said shell to provide an annular recirculating chamber within said shell about said casing with which recirculating chamber said outlet communicates, a plurality of flow directing vanes carried by said casing about said outlet for reducing the rotational movement of the water at the upper terminus of said vortex, said shell having a separating chamber therein, a floc concentrator within said shell and having an open let upper end located at a predetermined location in the shell to allow precipitated floc to flow from the separation chamber, said floc concentrator extending downwardly in the shell and having its lower end opening out through the side of the shell, and a horizontal deflection plate in said shell directly below the bottom of said floc concentrator for laterally deflecting liquid flowing upwardly in the shell.

11. In a water treating apparatus, an outer shell having an outlet for treated water, a casing within said shell forming a mixing chamber having an outlet at its upper end and an inlet of reduced cross sectional area with respect to its outlet located at its lower end, means for feeding chemicals into said mixing chamber, a plurality of nozzles extending tangentially into said mixing chamber in circumferentially spaced relation a short distance upwardly from the inlet to discharge a plurality of streams of water into the mixing chamber tangentially of the walls thereof to produce an upwardly diverging vortex in the mixing chamber with the apex of the vortex in line with and in proximity to said restricted inlet to draw liquid from within the shell through said inlet into the mixing chamber for passage therethrough, said casing being located in said shell to provide an annular recirculating chamber within the shell about said casing with which recirculating chamber said mixing chamber outlet communicates, a plurality of flow directing vanes carried by said casing about said outlet for reducing the rotational movement of the water at the upper terminus of the vortex, said shell having a separation chamber therein, a floc concentrator within said shell and having an open inlet upper end located at a predetermined location in the shell to allow precipitated floc to flow from the separation chamber, and a horizontal deflection plate within said casing for laterally deflecting liquid flowing upwardly through the mixing chamber.

12. In a water treating apparatus, an outer shell having an outlet for treated water, a casing within said shell forming a mixing chamber having an outlet at its upper end and an inlet of reduced cross sectional area with respect to its outlet located at its lower end, means for feeding chemicals into said mixing chamber, a plurality of nozzles extending tangentially into said mixing chamber in circumferentially spaced relation a short distance upwardly from the inlet to discharge a plurality of streams of water into the mixing chamber tangentially of the walls thereof to produce an upwardly diverging vortex in the mixing chamber with the apex of the vortex in line with and in proximity to said restricted inlet to draw liquid from within the shell through said inlet into the mixing chamber for passage therethrough, a partition in said shell forming a separation chamber and a reaction chamber, said casing being located in said reaction chamber, and a conduit extending from adjacent said inlet through said partition to permit flow of liquid from said mixing chamber into said separation chamber, said partition inclining downwardly for a short distance inwardly of the shell to provide a limited sediment collection space at the bottom of said separation chamber.

In a water treating apparatus, an outer shell having an outlet for treated water, a casing within said shell forming a mixing chamber having an outlet at its upper end and an inlet of reduced cross sectional area with respect to its outlet located at its lower end, means for feeding chemicals into said mixing chamber, a plurality of nozzles extending tangentially into said mixing chamber in circumferentially spaced relation a short distance upwardly from the inlet to discharge a plurality of streams of water into the mixing chamber tangentially of the walls thereof to produce an upwardly diverging vortex in the mixing chamber with the apex of the vortex in line with and in proximity to said restricted inlet to draw liquid from within the shell through said inlet into the mixing chamber for passage therethrough, a partition in said shell forming a separation chamber and a reaction chamber, said casing being located in said reaction chamber, a conduit extending from adjacent said inlet through said partition to permit flow of liquid from said mixing chamber into said separation chamber, a liquid deflecting plate located a short distance outwardly of the outlet of said conduit for deflecting liquid issuing from the conduit laterally towards the side of said shell.

14. In a water treating apparatus, an outer shell having an outlet for treated water, a casing within said shell forming a mixing chamber having an outlet at its upper end and an inlet of reduced cross sectional area with respect to its outlet located at its lower end, means for feeding chemicals into said mixing chamber, a plurality of nozzles extending tangentially into said mixing chamber in circumferentially spaced relation a short distance upwardly from the inlet to discharge a plurality of streams of water into the mixing chamber tangentially of the walls thereof to produce an upwardly diverging vortex in the mixing chamber with the apex of the vortex in line with and in proximity to said restricted inlet to draw liquid from within the shell through said inlet into the mixing chamber for passage therethrough, said casing being located in said shell to provide an annular recirculating chamber within the shell about said casing with which recirculating chamber said mixing chamber outlet communicates, a plurality of circumferentially spaced vertically curved flow guiding vanes carried by said casing at said outlet for reducing the rotational movement of the water at the upper terminus of the vortex, said shell having a separation chamber therein, a floc concentrator within said shell and having an open inlet upper end located in the separation chamber to allow precipitated floc to flow from the separation chamber and having its lower outlet end opening out through the side of said shell.

GEORGE P. CLEMENT.

REFERENCES CITED

The following references are of record in the file of this patent:

UNITED STATES PATENTS

| Number | Name | Date |
| --- | --- | --- |
| 1,963,200 | Hawley | June 19, 1934 |
| 2,179,246 | Applebaum | Nov. 7, 1939 |
| 2,314,977 | Green | Mar. 30, 1943 |
| 2,348,124 | Green | May 2, 1944 |
| 2,353,358 | Prager | July 11, 1944 |
| 2,355,069 | Green | Aug. 8, 1944 |
| 2,364,023 | Green | Nov. 28, 1944 |
| 2,365,293 | Robinson | Dec. 19, 1944 |
| 2,370,356 | Kamp et al. | Feb. 27, 1945 |
| 2,391,697 | Green | Dec. 25, 1945 |
| 2,400,598 | Prager | May 21, 1946 |
| 2,404,701 | Felsecker | July 23, 1946 |
| 2,425,372 | Green | Aug. 12, 1947 |